United States Patent Office 3,374,358
Patented Mar. 19, 1968

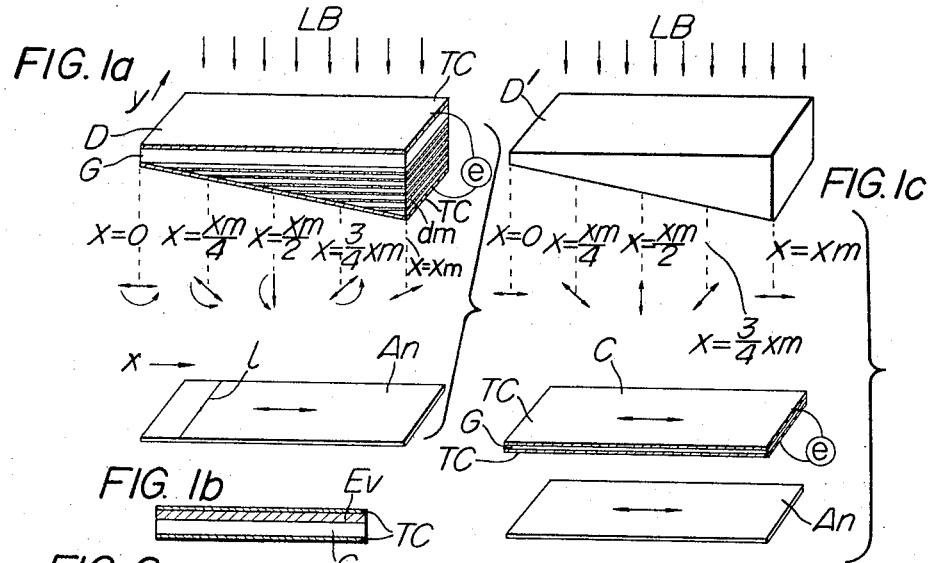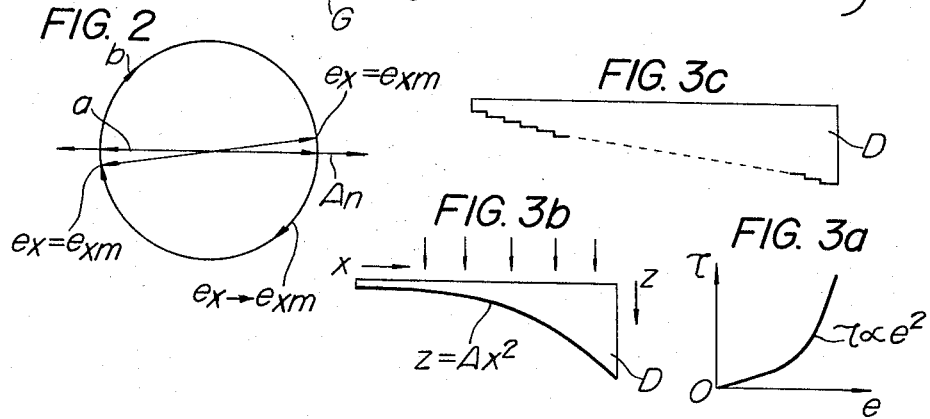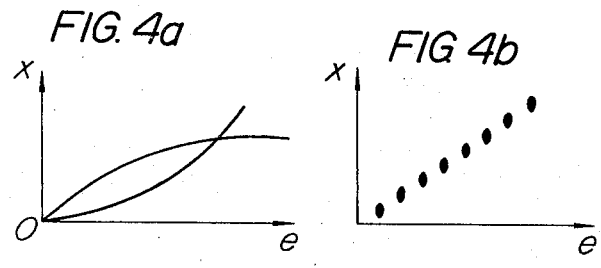

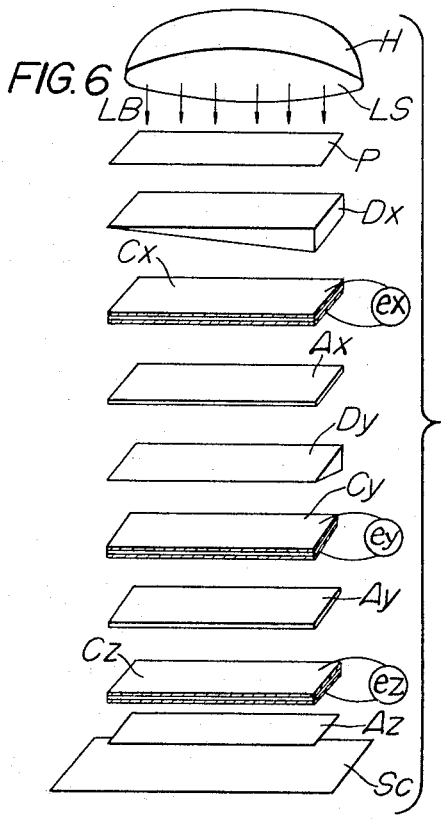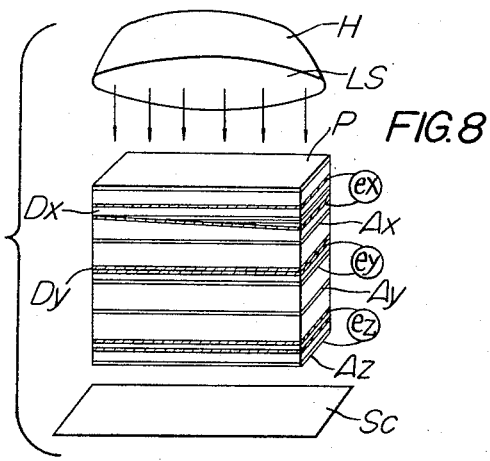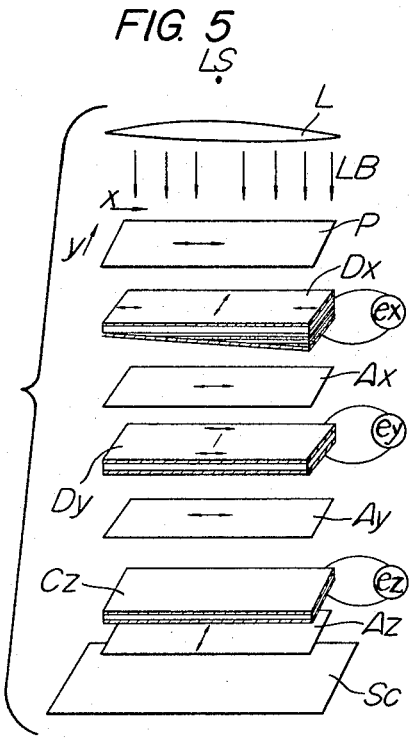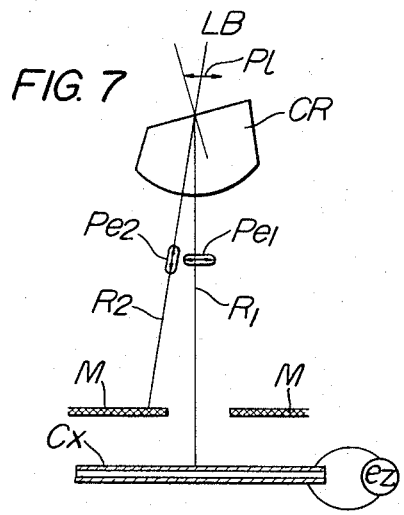

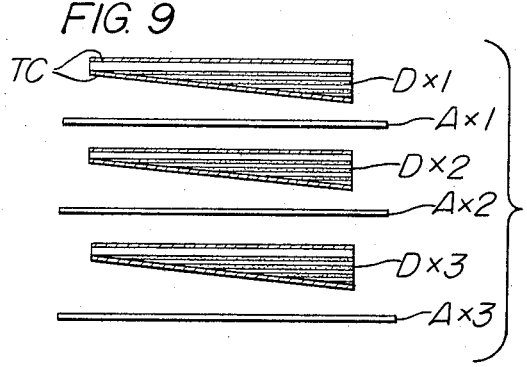
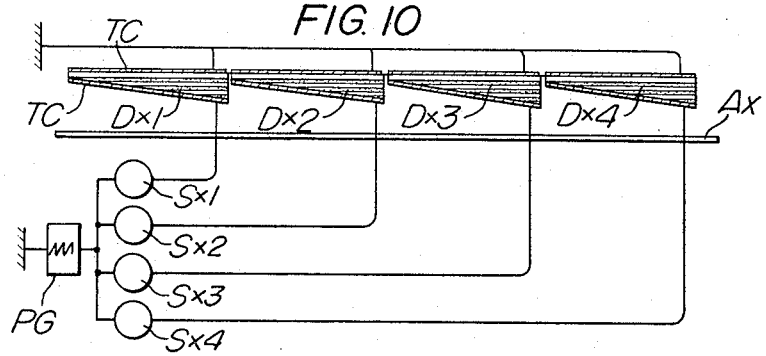
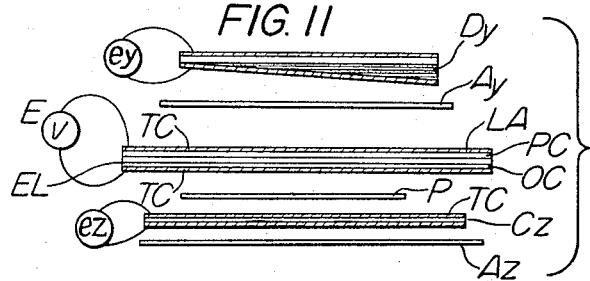
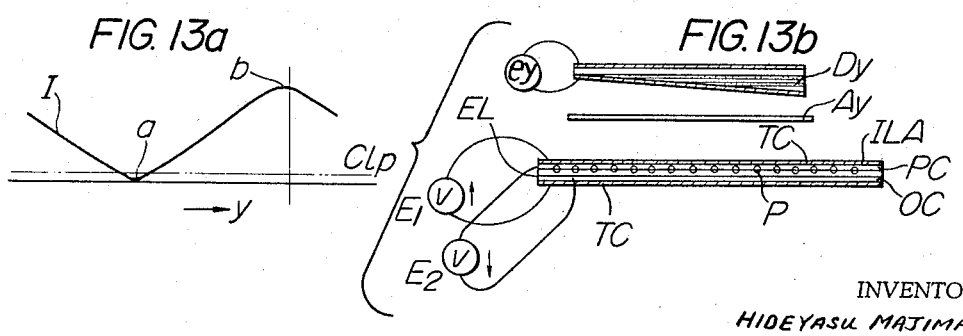

3,374,358
LIGHT DISPLAY DEVICE EMPLOYING
ANGULARLY SELECTIVE POLARIZER
Hideyasu Majima, Hachioji-shi, Japan, assignor to Hitachi,
Ltd., Tokyo, Japan, a corporation of Japan
Filed Oct. 20, 1965, Ser. No. 498,217
Claims priority, application Japan, Oct. 30, 1964,
39/61,258
8 Claims. (Cl. 250—213)

This invention relates to light selection devices designed to produce a pattern of light image like the one obtained on an oscilloscope without use of any electron tube or mirror system.

In general, oscilloscopes employ a cathode-ray tube, having a limited image area, and are based upon the high level of electronic and vacuum techniques. Other systems employing mirrors are susceptible to mechanical shock and inherently limited in speed of operation, involving difficulty in adjustment.

The present invention is intended to obtain a pattern of optical image by selecting necessary portions of a parallel beam of light impinging upon a plane by entirely electrical means of utilizing the shuttering function of optical polarization and, according to the present invention, a light selection device comprises an electro-optically active element including an optical gyrator having along the direction light transmission a thickness varying in a direction at right angles to the direction of light transmission and an electro-optically active gyrator having an angle of optical rotation controllable under a voltage applied thereto, said electro-optically active gyrator being arranged to act upon the light transmitted through said optical gyrator and having a direction of vibration in said direction at right angles to the direction of light transmission, and a light-analyzing element for detection of light having a predetermined direction of vibration and including an analyzer arranged to receive the rotated light emerging from said electro-optically active element.

In order that the invention may be readily understood, it will be described with references to the accompanying drawings, in which:

FIG. 1 is a schematic diagram illustrating a type of light deflecting element usable in the invention;

FIG. 2 is a diagram illustrating the operating principle of the same;

FIG. 3 illustrates another type of light deflecting element usable in the invention, in cross section, and includes a graphical representation of its characteristic;

Figure 12B:
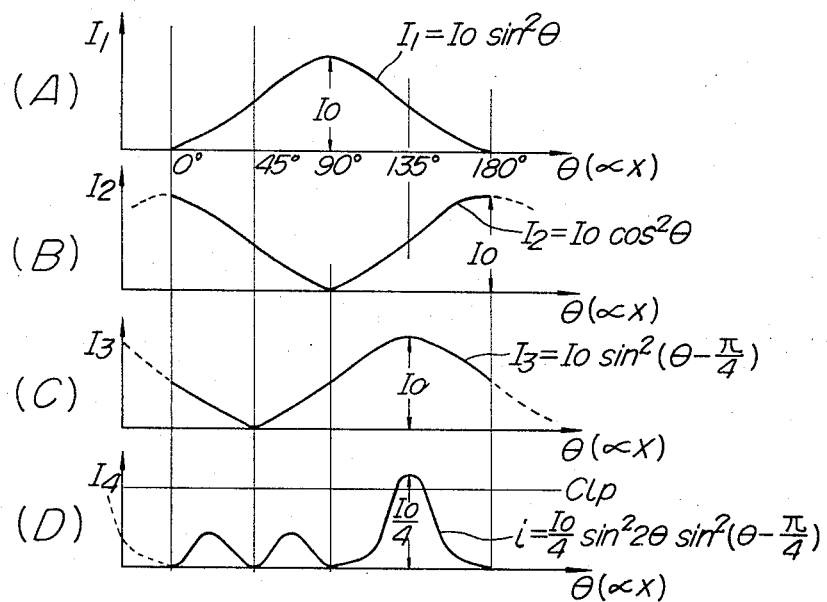

FIG. 4 graphically illustrates the operating characteristics of the deflecting elements shown in FIGS. 1 and 3;

FIGS. 5 and 6 illustrate two respective practical embodiments of the invention;

FIG. 7 diagrammatically illustrates the manner in which double imaging is prevented;

FIG. 8 is a schematic diagram illustrating a method of improving the output of the embodiment shown in FIG. 5;

FIGS. 9 and 10 are explanatory diagrams illustrating different means for enhancing the image resolution of the inventive system;

FIG. 11 diagrammatically illustrates use of a light amplifier for the purpose;

FIG. 12 illustrates another arrangement for obtaining an improved image resolution and its operating characteristics; and FIG. 13 illustrates a special method of obtaining an improved image resolution.

Reference is now made to the drawings and first to FIG. 1, in which the light deflector, one of major elements of the present invention, is shown in two forms.

In FIG. 1a, reference character G indicates a body of electro-optically active material having a uniform thickness with a tapered body of transparent dielectric or resistive material $d_m$ bonded to one surface of the electro-optically active body G. Transparent conductors $T_c$ are bonded to the other surface of the electro-optically active body G and to the outer or tapered surface of the dielectric or resistive body $d_m$ to form a special polarizer. It will be understood that any desired voltage $e$ may be applied to this polarizer across the opposite conductors $T_c$. An analyzer $A_n$, another major element of the inventive device, is arranged as shown, in which there is one direction of light vibration, right and left, as indicated by the double-headed arrow. The dielectric or resistive body $d_m$ is given a conductance or impedance in the direction of thickness of the same order as the conductance or impedance of the electro-optically active body G in its direction of thickness and may, for example, take the form of a molded or protruded product of acetyl cellulose or a sheet of nylon molding compound. The electro-optically active body G is formed of a material having a dependability on an electric field, such as $NH_3H_2PO_4$ (referred to hereinafter as ADP) or $KH_2PO_4$ (referred to hereinafter as KDP).

The polarizer shown in FIG. 1b includes a body of electro-optically active material having a definite thickness with a body of highly resistive material $E_v$ bonded thereto. The resistive body $E_v$ is generally similar in resistance to the electro-optically active body G and has a specific resistance gradually varying from point to point. The resistive body is transparent and, under a voltage applied across a pair of transparent conductors $T_c$, serves to gradually vary the electric field acting upon the electro-optically active body G from point to point. Though the body $E_v$ has been described as formed of a resistive material, it may also be formed of a material which is capacitive with respect to an AC electric field. An appropriate resistive material for the body $E_v$ is an electrically conductive glass having its conductivity reduced to the extreme. Such material can be obtained, for example, by admixing silicon carbide to Vicol glass, soda lime glass or the like, or by reducing the electric conductivity of $SnO_2$.

FIG. 1c illustrates another form of light deflecting element which includes a tapered member D' formed of an electro-optically active substance and arranged immediately behind a polarizer. The member may be formed, for example, of quartz, HgS or a crystal group of KDP or also take the form of a Kerr cell placed under a certain voltage. Receiving a parallel beam of light LB, the tapered member D' transmits polarized light varying in direction of vibration from point to point. A polarization gyrator C is arranged so as to rotate the differently polarized light rays uniformly in response to the voltage applied across the transparent conductors $T_c$.

In the different arrangements described above, the analysis of polarized light is supposedly performed in substantially the same manner and now description will be made only with reference to FIG. 1a. Suppose that the vibration direction of the analyzer $A_n$ is in the direction of x-axis (extending right and left on the sheet) and that a parallel flux of polarized light LB impinging from above is vibrating in the direction of $x$. The special polarization element D is supposed to have its optical axis extending in the direction of light propagation. When the voltage $e$ applied across the transparent conductors $T_c$ has a value $e_0$, the light flux LB being transmitted through the polarization element D is polarized to an extent varying in the $x$ direction, as illustrated. Namely, at $x=0$, the transmitted light is polarized in the $x$-direction while at the opposite extreme, $x=x_m$, it is rotated further through an angle of from nearly 90° to 180°. Here, the amount of rotation of the polarized light is proportional to the voltage applied in the direction of thickness of the electro-optically active body G so that the angle of rotation of the polarized light varies linearly with $x$ between $x=0$ and $x=x_m$, where a maximum angle of rotation is obtained. When the voltage $e$ being applied to the special polarization element D is changed, it will be noted that the vibration direction of the polarized light or the light transmitted through the element D is rotated uniformly. The angle of optical rotation along the optic axis is generally proportional to the voltage applied to the electro-optically active sheet G. In the event that the vibration direction of the polarized light is rotated as described above, the amount of polarized light transmitted through the analyzer $A_n$ and close to $x=0$, where it is at its maximum when $e=0$, is reduced and the maximum transmittivity of polarized light is obtained at another location along the $x$-axis, since the analyzer $A_n$ has its vibration direction only along the $x$-axis. That portion of the polarized light transmitted through the analyzer $A_n$ with the maximum transmittivity can be observed as a straight line extending transversely at right angles to the $x$-axis, for example, as indicated at $l$. The direction of the line $l$ will be referred to as $y$ direction hereinafter.

Reference will next be made to FIG. 2, which represents an operation diagram illustrating the difference in polarization effect between the arrangement shown in FIG. 1a or 1b and FIG. 1c.

In FIG. 1a, the light passing through the special polarization element D at $x=0$, when the impressed voltage $e=e_0$, is a polarized light as indicated by the arrow $a$ in FIG. 2. This light has a vibration direction coincident to that of the analyzer $A_n$ and is observed as a straight line extending in the $y$ direction at the location of $x=0$. Subsequently, as the voltage applied to the polarization element D is increased, the direction of polarization is gradually rotated as indicated by the circular arrow $b$ so that the polarized light emerging from the element D having a vibration direction varying along the $x$-axis is allowed to pass through the analyzer $A_n$ at consecutive points along the $x$-axis to be observed thereon. In the case of FIG. 1c, the light, initially passing through the tapered electro-optically active element D', is polarized by the latter in a direction varying along the $x$-axis in a predetermined fashion. Also in this case, the vibration direction of the polarized light is varied in the same manner as in the case of FIG. 1a, i.e., in the manner indicated in FIG. 2 by the arrow $b$, as the voltage applied to the plate C of electro-optically active material is increased. In this manner, a straight line of light extending in the $y$ direction can be observed on the analyzer plate $A_n$ at a point along the $x$-axis where the rotated direction of polarized light coincides with the direction of polarization of the analyzer $A_n$. It is to be understood that the rotation of the plane of polarization may not necessarily be effected by use of an electro-optically active optical gyrator plate as described above but may alternatively be performed by any suitable mechanical means, for example, by mechanically rotating a polarizer to rotate the plane of polarization of the light flux LB.

FIG. 3 illustrates another form of tapered optical gyrator D. In the case where the desired relationship between the voltage $e$ applied to the tapered optical gyrator D and the angle of optical rotation $\varphi$ is expressed by $\varphi \propto e^2$, as shown in FIG. 3a, the tapered surface of the gyrator D may, for example, be curved in proportion to $x^2$ as shown in FIG. 3b. Another example of tapered optical gyrator having similar characteristics is shown in FIG. 3b, which has a stepped inclined surface and thus exhibits a light transmittivity varying stepwise under a uniform voltage applied. It will be noted that under a given voltage a strip of light of uniform intensity appears on the analyzer at a location corresponding to the applied voltage, having the same width as that of the steps forming the inclined gyrator surface. FIG. 4 illustrates the relationship between the applied voltage value and the location of the light strip along the $x$-axis, as obtained with the optical gyrator shown in FIG. 3b or 3c. As observed in FIG. 4a, the relationship obtained with the optical gyrator of FIG. 3b is parabolic as a square or square root of $x$. FIG. 4b illustrates the relationship between the location of the maximum light transmittivity and the voltage applied to the optical gyrator of FIG. 3c.

FIGS. 5 and 6 illustrate embodiments of the present invention employing respective forms of light deflecting element shown in FIGS. 1a and 1c. Description will next be made with reference only to FIG. 5 as the embodiment of FIG. 6 will be apparent from such description on the embodiment of FIG. 5. It will be appreciated from the following description that the embodiments shown in FIGS. 5 and 6 each represent a combined polarizer and analyzer system for obtaining a pattern of light image similar to the one obtainable on a conventional oscilloscope.

Referring to FIG. 5, a point source of light LS having an extremely high brightness is arranged above a lens L at its focus to project therethrough a parallel beam of light LB. A polarizer plate P is provided to polarize the light beam LB and has a direction of polarization extending right and left on the sheet or in the direction of $x$-axis. Reference character $D_x$ indicates a special polarization element provided for the purpose of selecting the polarized light from the polarizer plate P in the direction of $x$-axis and $A_x$ indicates an analyzer transmitting light polarized in the $x$ direction. The location along the $x$-axis at which the polarized light is transmitted through the analyzer $A_x$ is controlled under a voltage $e_x$ applied to the polarization element $D_x$. A similar combination of special polarization element and analyzer $D_y$–$A_y$ is arranged as shown for light selection in the $y$ direction and also a voltage $e_y$ is applied to the polarization element $D_y$. The beam of light LB is thus projected on the second analyzer $A_y$ as a spot. Disposed below the analyzer $A_y$ is a brightness modulator $C_z$ for controlling in the direction of $z$-axis. Further below the modulator $C_z$ are disposed a third analyzer $A_z$ for detecting light polarized in the $z$-direction and an image screen $S_c$.

The brightness modulator $C_z$ is a plate of an optically active crystalline substance, such as KDP or ADP, with transparent conductors $T_c$ bonded to its opposite surfaces. The crystalline plate need not have an optic axis coincident with the direction of light. In the case where the optic axis of the brightened modulator $C_z$ does not coincide with the direction of light, it functions like a Kerr cell so that the perfectly polarized light input to the modulator is divided during passage therethrough into two rays, ordinary and extraordinary, both of which are elliptically polarized.

FIG. 7 illustrates the method of obtaining a normal image from a double image as produced when the light beam incident on the surface of the brightness modulator plate $C_z$ is not normal thereto. Ordinarily, when the incident light is normal to the plate $C_z$, the light transmitted therethrough does not form a double image, but as long as the light incidence is inclined to any more or less extent a double image results due to the birefringence effect of the crystalline plate $C_z$.

In FIG. 7, it is assumed that the light beam LB is formed of perfectly linearly polarized light and impinges on the surface of the crystalline modulator $C_z$ at an angle thereto, for example, as the output of the analyzer $A_y$ shown in FIG. 5. With the presence of a crystal CR, the linearly polarized light $Pl$ passing therethrough is divided into two rays $R_1$ and $R_2$, elliptically or linearly polarized as indicated at $P_{e1}$ and $P_{e2}$, respectively. The crystal CR need not have any optical rotary power nor have its optic axis disposed in coincidence with the direction of light transmission. The two rays $R_1$ and $R_2$ thus divided have respective planes of vibration, for example, at right angles to each other and are issued from the crystal in different directions. This enables use of a light absorbing mask M, for intercepting the extraordinary ray $R_2$ while allowing the ordinary ray $R_1$ to proceed further. Thus, formation of a double image can be effectively prevented by this procedure in cases where the light incident on the brightness modulator $C_z$ of FIG. 6 is inclined thereto. The above procedure is not only applicable in connection with the brightness modulator $C_z$ but can also be effectively utilized in cases where the light incident on the special polarization element D, gyrator plate C or other element is inclined.

It is desirable to eliminate any reflection losses involved in the system. In FIG. 8, the first embodiment of the invention is shown in perspective view with all its component parts embedded, for example, in a plastic or glass material having a refractive index nearly equal to that of the materials forming the elements. In general, a substance having a refractive index of $n_m$ has the following reflectivity $\gamma_f$ for incidence in air, which has a refractive index of 1:

$$\gamma_f = \left(\frac{n_m - 1}{n_m + 1}\right)^2$$

For an incident medium having a refractive index $n_m'$ which is approximate to $n_m$, the reflectivity $\gamma_f$ is reduced as expressed by the following formula:

$$\gamma_f = \left(\frac{n_m - n'_m}{n_m + n'_m}\right)^2$$

To summarize, the present invention employs a combination of special elements for polarization in the $x$- and $y$-directions, respectively, and a brightness modulator to obtain a desired pattern on the image screen, and if desired, may also employ means for prevention of a double image to obtain a clearly defined pattern just like that on conventional oscillographs. Further, according to the present invention, the entire system may be embedded in plastic or other material to eliminate light reflection losses.

The performance of the inventive device can be further improved by incorporating means for enhancing the image resolution.

FIG. 9 illustrates one example of such means, which is designed to minimize the blur of the light image. The following description is made only with respect to the polarization in the direction of $x$-axis, but it is obvious that the same principle applies also to the polarization in the $y$-direction.

In FIG. 9, a number of combinations of polarizer and analyzer $D_x$–$A_x$ are arranged over each other to obtain an intensified selectivity at each point along the $x$-axis for the purpose of enhancing the image resolution.

With this arrangement, the intensity of the light emerging from the final stage analyzer $A_{x3}$ along its axis is expressed as $$I = I_0 (\cos^2 \theta)^n$$

where $n$ represents the number of stages of polarizer-and-analyzer stacked along the axis, $I_0$ represents the maximum intensity of the light transmitted, and $\theta$ represents the angle between the vibration direction of the incident polarized light and the orientation of the analyzer.

FIG. 10 illustrates another method of improving the resolving power of the system. According to this method, a number of polarizers $D_{x1}$, $D_{x2}$, $D_{x3}$ and $D_{x4}$ are arranged in a plane side by side with the same number of switches $S_{x1}$, $S_{x2}$, $S_{x3}$ and $S_{x4}$ connected with the respective polarizers. These switches are changed over progressively from one to another each time the saw-tooth wave voltage applied to the polarizers is terminated so that the arrangement of polarizers is continuously swept over as a single polarizer element. With this arrangement, the intensity of the light flux transmitted is apparently increased compared to that obtained with the stacked arrangement as shown in FIG. 9.

FIG. 11 is given to explain the image formation by use of a light amplifier. The arrangement shown in FIG. 11 is applicable to the clipping of the wave peak portions of the incident light flux, intended to improve the resolving power of the system. As shown, the arrangement includes a light amplifier plate LA which comprises a photo-conductive film PC, an opaque film of high dielectric or conductive material OC, an electroluminescent film EL and transparent conductors $T_c$ forming the opposite surfaces of the plate. A power source E is provided to impress an appropriate voltage to the amplifier plate across the conductors $T_c$. The amplifier plate functions to amplify the incident light flux, previously determined in position by the procedure described, and clip off the peak portions of the amplified light wave to obtain a light image with improved resolution. Arranged below the amplifier plate LA is a brightness modulating system, including a polarizer P, a brightness modulator plate $C_z$ and an analyzer plate $A_z$, to produce a desired picture. For improved effectiveness, it is desirable to employ a light amplifier plate designed to give a positive feedback of the luminescent light to the photoconductive element. Such brightness modulation can also be accomplished by mechanical rotation of the analyzer plate provided for analysis of the polarized light output or alternatively by mechanical rotation of the plane of polarization of the incident polarized light relative to the analyzer.

Figure 12A:
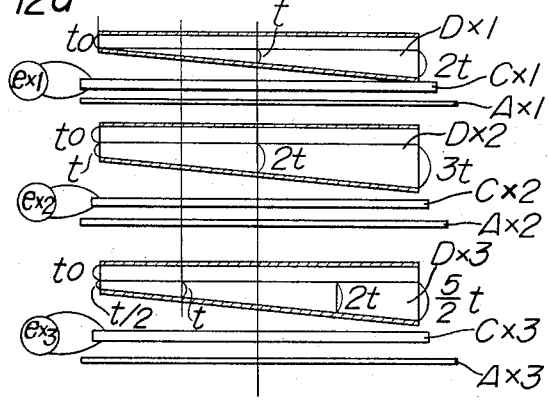

FIG. 12 illustrates a further device for improving the resolving power of the system, FIG. 12a illustrating the arrangement of polarizers and analyzers. FIG. 12b represents diagrams illustrating the distribution along the $x$-axis of the intensity of the transmitted light.

In FIG. 12a, reference characters $D_{x1}$, $D_{x2}$, and $D_{x3}$ indicate respective tapered optical gyrators having different thicknesses. These optical gyrators are arranged over each other in the direction of light transmissions as described in connection with FIG. 9, in combination with analyzers $A_{x1}$, $A_{x2}$ and $A_{x3}$ and electro-optically active plates $C_{x1}$, $C_{x2}$ and $C_{x3}$. In this arrangement, the optical gyrators $D_{x1}$, $D_{x2}$ and $D_{x3}$ are equally tapered having respective maximum thicknesses of $2t$, $3t$ and $5/2t$ and respective minimum thicknesses of $t_0$, $t$ and $t/2$, as illustrated. The thickness $t$ is one giving a maximum light transmission when $e_{x1}=e_{x2}=e_{x3}=e_{x0}$. $t_0$ indicates the thickness of each polarization element at $x=0$ and $e_{x1}$, $e_{x2}$ and $e_{x3}$ indicate voltages applied to the respective optical gyrators. These voltages can be selected to meet the condition $e_{x1}=e_{x2}=e_{x3}$ since the angle of optical rotation $\varphi$ varies linearly with the voltage applied to the gyrator.

When a voltage $e_{x1}$ is applied to the electro-optically active plate $C_{x1}$, the angle of optical rotation $\varphi$ is given a maximum value of 90° at point $t$ along the $x$-axis, where a maximum of light transmission is obtained, as seen in A of FIG. 12b. On this occasion, the intensity characteristic $I_1$ of the light transmitted is given by $I_1 = I_0 \sin^2 \theta$, where $\theta$ is the angle of optical rotation, $I_0$ the maximum incident light intensity and the transmission losses neglected. In quite the same manner, the intensity characteristics of $D_{x2}$ and $D_{x3}$ are as shown in B and C of FIG. 12b, respectively. The intensity of light transmitted through the polarization elements is observable on the final analyzer $A_{x3}$ as shown as curve $I_4$ in D of FIG. 12b.

The intensity curves are shifted simultaneously in the $x$-direction while maintaining the same phase relationships therebetween, with variation in voltage applied to the electro-optically active elements as long as the relationship $e_{x1}=e_{x2}=e_{x3}$ is maintained. The resultant output intensity $I_4$ has a conspicuous peak of value $I_0/4$, as shown in D of FIG. 12b. It will thus be noted that, if the intensity curve is clipped at the level of $Cl_p$ to pick up the peak value only, a pattern of high resolution obtains.

Another method of improving the image resolution is shown in FIG. 13. FIG. 13a illustrates the output of the analyzer $A_y$ used in the invention. Only, in this case, the tapered optical gyrator $D_y$ and the corresponding analyzer are in position displaced by an angle of 90° from their position in the arrangements described above to obtain a pattern of the darkest line or spot. Generally in such case, it has been found that the dark region A of the characteristic curve rises or, more correctly, falls sharply compared to the light region B.

In view of this, an arrangement is made as shown in FIG. 13b to obtain an improved image resolution by first producing a pattern of dark line, which is subsequently inverted to obtain a bright reproduction. In FIG. 13b, a combination of polarizer and analyzer $D_y$–$A_y$, together with that $D_x$–$A_x$ in the preceding stage, is employed to obtain a dark pattern. A light amplifier ILA is arranged below the polarizer and analyzer $D_y$–$A_y$ to serve the purpose of pattern inversion and carries conductors $T_c$ on its opposite surfaces. As illustrated, the light amplifier is comprised of a photoconductive layer PC having an electrode $p$ embedded therein, an opaque high-dielectric film OC and a layer of electroluminescent layer. Upon impression of an appropriate voltage $E_1 = -E_2$, the dark pattern obtained through the analyzer $A_y$ is inverted into a bright image, the peak portion of which can be clipped off by selecting a threshold value of response to improve the image resolution.

As will be appreciated from the foregoing description, light selection can be performed according to the present invention without employing any electronic tube device, thus enabling any conventional forms of plotting device employing an electron beam to be replaced by the inventive device. It will also be readily appreciated that the inventive device is highly valuable for various applications including not only picture-taking and projecting devices involving electro-optical conversion of information but also input and output devices of electronic computers and circuitries for memory and logical operations.

It is to be understood that the invention is not restricted to the features set forth but many changes and modifications may be made without departing from the spirit and scope of the invention as defined in the appended claims.

What is claimed is:

1. A light selection device comprising an electro-optically active element including an optical gyrator having along the direction of light transmission a thickness varying in a direction different to the direction of light transmission and an electro-optically active gyrator having an angle of optical rotation controllable under a voltage applied thereto, said electro-optically active gyrator being arranged to act upon the light transmitted through said optical gyrator and a light-analyzing element for detection of light having a predetermined direction of vibration including an analyzer arranged to receive the rotated light emerging from said electro-optically active element.

2. A light selection device comprising an electro-optically active element including an electro-optically active substance and a transparent resistive or dielectric substance joined thereto and having a resistance or electrostatic capacitance varying in a direction different to the direction of light transmission; means for applying a voltage to said electro-optically active element to rotate the light passing therethrough; and a light-analyzing element for detection of light having a predetermined direction of vibration and arranged to receive the rotated light emerging from said electro-optically active element.

3. A light selection device as set forth in claim 1, further comprising a second electro-optically active element for rotating the light emerging from the first-mentioned electro-optically active element in a direction different to the direction of optical rotation of the first electro-optically active element in a plane including said direction of optical rotation, a second light-analyzing element for detection of the light transmitted through the second electro-optically active element in a predetermined direction of vibration and the third combination of electro-optically active and light-analyzing elements arranged ahead of the second combination of electro-optically active and light-analyzing elements along the direction of light transmission.

4. A light selection device as set forth in claim 2, further comprising a second electro-optically active gyrator for rotating the light emerging from the first-mentioned electro-optically active gyrator in a direction different to the direction of optical rotation of the first-mentioned electro-optically active gyrator in a plane including said direction of optical rotation, a second light-analyzing element for detection of the light transmitted through the second electro-optically active element in a predetermined direction of vibration and a third combination of electro-optically active and light-analyzing elements arranged ahead of the second combination of electro-optically active and light-analyzing elements along the direction of light transmission.

5. A light selection device as set forth in claim 1 further comprising a light amplifier or a pattern-inverting light amplifier for clipping that portion of the intensity of the output light from said light-analyzing element which exceeds the threshold value of sensitivity of said light amplifier to sharply define the position of light selection.

6. A light selection device as set forth in claim 2 further comprising a light amplifier or a pattern-inverting light amplifier for clipping that portion of the intensity of the output light from said light-analyzing element which exceeds the threshold value of sensitivity of said light amplifier to sharply define the position of light selection.

7. A light selection device comprising plurality of the light selection device as set forth in claim 1, disposed along the direction of the light transmission, such as to reinforce the direction selection characteristics of the vibration of light causing to sharpen the position selecting characteristics.

8. A light selection device comprising plurality of the light selection device as set forth in claim 2, disposed along the direction of the light transmission, such as to reinforce the direction selection characteristics of the vibration of light causing to sharpen the position selecting characteristics.

No references cited.

RALPH G. NILSON, *Primary Examiner.*

M. ABRAMSON, *Assistant Examiner.*